Figure 1:
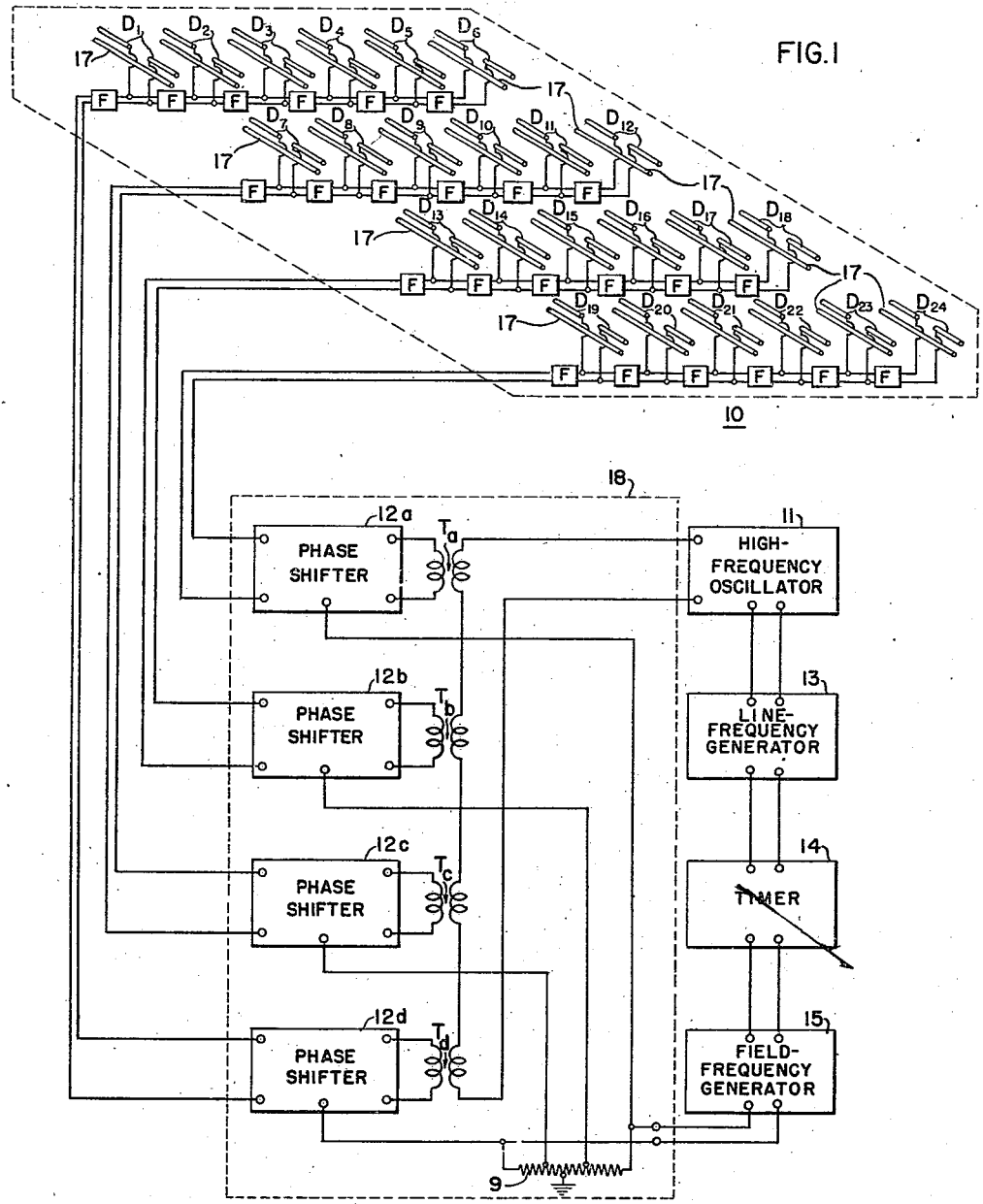

Oct. 22, 1946.  A. V. LOUGHREN  2,409,944

SYSTEM FOR SPACE-SCANNING WITH A RADIATED BEAM OF WAVE SIGNALS

Original Filed May 26, 1941

INVENTOR
ARTHUR V. LOUGHREN
BY
ATTORNEY

Patented Oct. 22, 1946

2,409,944

UNITED STATES PATENT OFFICE 2,409,944

SYSTEM FOR SPACE-SCANNING WITH A RADIATED BEAM OF WAVE SIGNALS

Arthur V. Loughren, Great Neck, N. Y., assignor by mesne assignments, to Hazeltine Research, Inc., Chicago, Ill., a corporation of Illinois Original application May 26, 1941, Serial No. 395,172. Divided and this application November 12, 1941, Serial No. 418,712

10 Claims. (Cl. 250—11)

This invention relates to systems for space-scanning with a radiated beam of wave signals and, while the invention is of general application, it is of particular utility in systems of the type in which a predetermined space is scanned with a sharply-concentrated radiated beam in order to locate a radiated-signal reflector, such as an aircraft.

The present application is a division of applicant's copending application Serial No. 395,172, filed May 26, 1941, for a "System for locating a radiated-signal reflector."

It has been proposed in aircraft locating systems to scan a predetermined space in two directions with a sharply-concentrated radiated beam of wave signals and to receive the signal which is reflected from the aircraft to provide an indication of its direction from the locating station. It has also been proposed to deflect the radiated beam at a different frequency in each of two directions in order to scan a given space and to utilize a cathode-ray tube at the receiving station as the direction-indicating device, the electron beam of the cathode-ray tube being deflected synchronously with the deflection of the radiated beam. However, such systems of the prior art have had the disadvantage that mechanical beam-deflecting arrangements were necessary for causing the radiated beam to scan the desired space. The general disadvantages of mechanical scanning arrangements are well understood by those skilled in the television art and many of these disadvantages are also present in mechanical scanning arrangements of the type under consideration.

It is an object of the present invention, therefore, to provide an improved system for scanning a predetermined space with a sharply-concentrated radiated beam of wave signals which is not subject to one or more of the disadvantages of prior art systems of the type mentioned above.

It is a further object of the invention to provide a nonmechanical scanning system for scanning a predetermined space with a radiated beam of wave signals.

In accordance with a feature of the invention, a system for scanning a predetermined space with a radiated beam comprises, a radiating system including a plurality of signal radiators geometrically spaced in either of two dimensions, or both, means including a plurality of electrical delay networks for electrically spacing the signal radiators in one of the dimensions, and a source of high-frequency wave signals. This signal comprises means for individually applying wave signals from said source to the signal radiators for directive radiation effectively in the form of a sharply-concentrated beam and means for varying the frequency of the wave signals effectively to vary the relative phase of the signals as applied to the signal radiators which are spaced in one of the two above-mentioned dimensions thereby to vary the direction of transmission of the radiated beam to effect a scanning operation in one dimension. If the radiators are geometrically spaced in two dimensions, the system includes also means for varying the relative phase of the signals as applied to said signal radiators which are spaced in the other of said predetermined dimensions at a second predetermined frequency, thereby to vary the direction of transmission of the radiated beam in two dimensions to scan a predetermined space.

For a better understanding of the invention, together with other and further objects thereof, reference is had to the following description taken in connection with the accompanying drawing and its scope will be pointed out in the appended claims.

Figure 1A:
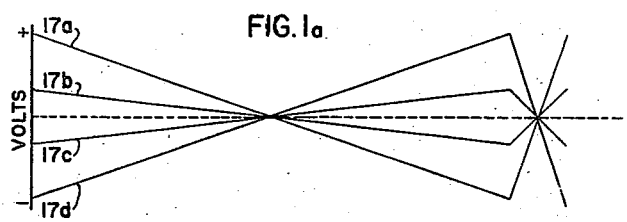

Fig. 1 of the drawing is a circuit diagram, partly schematic, of a system for scanning a predetermined space with a sharply-concentrated radiated beam of wave signals; and Fig. 1a comprises a set of graphs which are used in explaining a portion of the operation of the arrangement of Fig. 1.

Referring now more particularly to Fig. 1 of the drawing, the system there represented comprises an antenna system 10, means for applying a wave signal to the antenna system for directive radiation effectively in the form of a sharply-concentrated beam, and means for cyclically varying the frequency of the wave signal and, by virtue of the antenna characteristics as described hereinafter, causing the beam to scan a predetermined space in one direction. The antenna system 10 includes a plurality of directional signal radiators shown as dipoles $D_1$–$D_{24}$, inclusive, geometrically, or physically spaced in two dimensions and electrically spaced in one dimension. Specifically, the conductors of the dipoles are all disposed in the same horizontal plane and are parallel to each other. Dipoles $D_1$–$D_6$, inclusive, are spaced in a first dimension in a longitudinal array, while the sets of dipoles $D_7$–$D_{12}$, inclusive, $D_{13}$–$D_{18}$, inclusive, and $D_{19}$–$D_{24}$, inclusive, are similarly spaced in other horizontal arrays and are arranged, in the order named, to one side of the set of dipoles $D_1$–$D_6$, inclusive, to form an array of dipole sets, each set including an array of six dipole antennae and the sets being spaced in a second dimension. The dipoles of each of the above-mentioned sets of dipoles are energized in parallel except that the above-mentioned electrical spacing in the one dimension between the individual dipoles of the sets is provided by delay networks F interposed between adjacent dipoles. The geometrical spacing of the dipoles in each set in the above-mentioned one dimension is preferably made approximately one-half wave length of the mean or nominal frequency of the wave signal to be applied to the system, while the electrical spacing due to delay networks F, F is made to be an integral number of wave lengths at the nominal or mean frequency of the system. The sets of dipoles are also preferably spaced in the dimension normal to the sets, or in the above-mentioned second dimension, by a distance approximately equal to one-half the wave length of the mean or nominal frequency of the wave signal to be applied to the system.

The means for applying a wave signal to the antenna system 10 for directive radiation effectively in the form of a sharply-concentrated beam comprises a high-frequency oscillator 11 of any suitable type adapted for frequency modulation individually coupled to each of the sets of dipoles through transformers $T_a$, $T_b$, $T_c$, and $T_d$ having their primary windings connected in series and coupled to the high-frequency oscillator 11 and their respective secondary windings coupled to the above-mentioned sets of dipoles through phase shifters 12a, 12b, 12c, and 12d, respectively, which have the same phase shift at the nominal or mean value of the field-frequency generator.

In order to vary the relative phase of the signals as applied to the signal radiators of antenna system 10 which are spaced in the above-mentioned one dimension at a first predetermined frequency, there is provided means for varying the frequency of the signal developed by the high-frequency oscillator 11 at the above-mentioned first predetermined frequency. Specifically, there is provided a line-frequency generator 13 which is adapted to be synchronized from a timer 14, the output circuit of the line-frequency generator 13 being coupled to high-frequency generator 11 in order to vary the output frequency of this unit in accordance with the wave form of the signal developed by line-frequency generator 13, in any conventional manner.

In order to vary the relative phase of the signals as applied to the signal radiators of antenna 10 which are spaced in the above-mentioned second dimension at a second predetermined frequency, there is provided a field-frequency generator 15, also adapted to be synchronized by timer 14 and having an output circuit coupled across a voltage-divider resistor 9, the mid-tap of which is grounded. A control voltage is derived from one end of resistor 9 and utilized to control phase shifter 12a while a voltage of opposite polarity is derived from the other end of resistor 9 and utilized to control phase shifter 12d. Control voltages for phase shifters 12b and 12c are derived from intermediate points on resistor 9 as illustrated in the drawing. The phase shifters 12a–12d, inclusive, may be of any conventional type and it is to be understood that the phase shift of each of these units is dependent upon the magnitude and polarity of the control voltage derived from the resistor 9 for the particular unit under consideration.

In order to suppress radiation downward from the plane including the conductors of dipoles $D_1$–$D_{24}$, inclusive, a reflecting conductor 17 is disposed below each of the dipoles. These reflectors increase the useful energy in the desired direction of radiation and minimize minor spurious beams.

In considering the operation of the system of Fig. 1 and neglecting for the moment the functions of generators 13 and 15, it will be seen that the system comprises a plurality of directional signal radiators geometrically spaced in the above-mentioned first dimension and in the above-mentioned second dimension and that the signal radiators which are geometrically spaced in the first dimension are also electrically spaced by a time-phase displacement due to time-delay units F. Considering for the moment only the set of dipoles $D_1$–$D_6$, inclusive, in the condition where they are all excited in the same phase, it is seen that this is a known form of antenna array by which the radiation is concentrated relative to the radiation pattern of a single dipole. The concentration of energy into the beam takes place at the expense of the regions generally in the direction of the ends of the row of dipoles. Furthermore, it is seen that the reflectors 17 limit or suppress a substantial part of the radiation in the direction in which they are spaced from their associated dipole conductors. The resulting radiation pattern has a fan-shaped configuration with its major dimension vertically above the row of dipoles, its smallest dimension parallel to the row, and its intermediate dimension parallel to the individual dipoles.

The effect of adding the other sets of dipoles is to concentrate the radiated signal to the form of a sharply-concentrated beam. In the case where all rows are excited with a common phase the direction of this beam will be at right angles to the plane of the complete array. The reason for this is that the signals radiated from any pair of antennae are in phase only in the direction normal to the plane containing the dipoles.

Considering now the function of line-frequency generator 13, it is seen that it is effective to vary the frequency of the output of oscillator 11 cyclically and directly in accordance with its wave form, which is preferably a linear saw-tooth wave form. Due to the fact that the dipoles of each of the above-mentioned sets are electrically spaced by the time-delay networks F, the effect of this frequency variation is to vary the relative phase of the excitation of the dipoles of each set. Thus, for a frequency somewhat different than the nominal or mean frequency of the system, the signals radiated by each of a pair of adjacent dipoles of a set are not in phase in the vertical direction but are in phase in a direction displaced therefrom by an amount dependent upon the relative phase of antenna excitation. Thus, the line-frequency generator 13 comprises means for varying the phase of the signal as applied to the signal radiators of each of the above-mentioned sets at the frequency of the signal generated by line-frequency generator 13 as a result of the frequency variation of the output of oscillator 11 by line-frequency generator 13 and for effecting space-scanning by the concentrated radiated beam in lines in the above-mentioned one dimension.

If the effect of field-frequency generator 15 is now considered, it is seen that the voltage output of this generator, which is also preferably of a linear saw-tooth wave form, is effective to vary the relative phase of the dipoles which are spaced in the above-mentioned second dimension at the frequency of this generator. Reference is made to Fig. 1a for an explanation of the operation of this generator. Thus, curves 17a, 17b, 17c, and 17d represent the control voltages applied to phase shifters 12a, 12b, 12c, and 12d, respectively. It is thus seen that, at the beginning of the field-trace period, the signals applied to sets of dipoles $D_1$–$D_6$, inclusive, and $D_7$–$D_{12}$, inclusive, are shifted in phase in one sense and by different amounts and that the signals applied to sets of dipoles $D_{13}$–$D_{18}$, inclusive, and $D_{19}$–$D_{24}$, inclusive, are correspondingly shifted in phase in the opposite sense and by different amounts. The result of this excitation is to tilt the transmitted beam in the above-mentioned second dimension because it is only in such a direction that the signals radiated by two adjacent dipoles which are spaced in the second dimension, for example, dipoles $D_6$ and $D_{12}$, are exactly in phase. Furthermore, it is seen that the amount of this tilt in the second dimension changes during the field-scanning period due to the change of relative excitation phase of the sets of dipoles effected by field-scanning generator 15. Specifically, the amount of tilt in the second dimension decreases to zero, at which time the beam is vertical and then increases in the opposite sense. The arrangement of Fig. 1 is thus effective to vary the direction of transmission of the sharply-concentrated beam in two directions to scan a predetermined space with the beam.

While applicant does not intend to limit the invention to any particular design constants, the following values are appropriate for a system for scanning space with a radiated beam for use in a plane-locating system:

Mean or normal frequency for oscillator 11 _____ 100–1000 megacycles
Frequency of line-scanning generator 13 _____ 500–5000 cycles
Frequency of field-scanning generator 15 _____ 10–30 cycles
Time delay of Networks F _____ 5 to 10 periods at nominal carrier frequency.

It has heretofore been stated that the spacing between the dipoles of the sets of dipoles $D_1$–$D_6$, inclusive, $D_7$–$D_{12}$, inclusive, etc., is preferably made approximately one-half wave length of the mean or nominal frequency of the operating frequency range of the antenna system. When the networks F have a time delay of five periods at the nominal operating frequency of the system, it will be evident that the networks provide between any adjacent pair of dipoles an electrical spacing having a value, measured in wave lengths of the nominal operating frequency of the system, ten times the value of physical spacing of the dipoles of a set. Likewise, a time delay of ten periods provides an electrical spacing twenty times the physical spacing. Electrical spacings of ten to twenty times the physical spacings, as referred to adjacent pairs of dipoles, are of a higher order of magnitude than the physical spacings and this is the meaning of the term "higher order of magnitude" as used in the appended claims.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for scanning a predetermined space with a radiated beam comprising, a radiating system including a plurality of signal radiators geometrically spaced in one dimension, means including a plurality of electrical delay networks for electrically spacing said signal radiators in said one dimension, a source of high-frequency wave signals, means for individually applying wave signals from said source to said signal radiators for directive radiation effectively in the form of a sharply-concentrated beam, and means for varying the frequency of said wave signals effectively to vary the relative phase of said signals as applied to said signal radiators, thereby to vary the direction of transmission of said radiated beam.

2. A system for scanning a predetermined space with a radiated beam comprising, a radiating system including a plurality of signal radiators geometrically spaced in one dimension and means for electrically spacing them in the said one dimension, a source of high-frequency wave signals, means for individually applying wave signals from said source to said signal radiators for directive radiation effectively in the form of a sharply-concentrated beam, and means comprising said electrical spacing means and means for varying the frequency of said wave signals effectively to vary the relative phase of the signals as applied to said radiators which are spaced in said one dimension at a first predetermined frequency, thereby to vary the direction of transmission of said radiated beam to effect a scanning operation in said one dimension.

3. A system for scanning a predetermined space with a radiated beam comprising, a radiating system including a plurality of signal radiators geometrically spaced in two dimensions and means for electrically spacing them in one of the two dimensions, a source of high-frequency wave signals, means for individually applying wave signals from said source to said signal radiators for directive radiation effectively in the form of a sharply-concentrated beam, means comprising said electrical spacing means and means for varying the frequency of said wave signals effectively to vary the relative phase of the signals as applied to said radiators which are spaced in said one dimension at a first predetermined frequency, and means for varying the relative phase of said signals as applied to said signal radiators which are spaced in the other dimension at a second predetermined frequency, thereby to vary the direction of transmission of said radiated beam in two dimensions to scan a predetermined space.

4. A system for scanning a predetermined space with a radiated beam comprising, a radiating system including a plurality of signal radiators effectively grouped in one dimension in a plurality of arrays which are spaced in alignment in another dimension, means for electrically spacing said signal radiators in said one dimension, a source of high-frequency wave signals, means for individually applying wave signals from said source to said signal radiators for directive radiation effectively in the form of a sharply-concentrated beam, means comprising said electrical spacing means and means for varying the frequency of said wave signals effectively to vary the effective phase of the signals as applied to said radiators which are spaced in said one dimension at a first predetermined frequency, and means for varying the relative phase of said signals as applied to said signal radiators which are spaced in said other dimension at a second predetermined frequency, thereby to vary the direction of transmission of said radiated beam in two dimensions to scan a predetermined space.

5. A system for scanning a predetermined space with a radiated beam comprising, a radiating system including a plurality of signal radiators geometrically spaced in two dimensions and means for electrically spacing them in one of the two dimensions, a source of high-frequency wave signals, means for individually applying wave signals from said source to said signal radiators for directive radiation effectively in the form of a sharply-concentrated beam, means comprising said electrical spacing means and means for varying the frequency of said wave signals in accordance with a saw-tooth wave form effectively to vary the relative phase of the signals as applied to said radiators which are spaced in said one dimension at a first predetermined frequency, and means for varying the relative phase of said signals as applied to said signal radiators which are spaced in the other dimension at a second predetermined frequency, thereby to vary the direction of transmission of said radiated beam in two dimensions to scan a predetermined space.

6. A radiated-signal translating system having a sharply-directive characteristic variable in one direction with frequency over a predetermined operating frequency range and variable in another direction with phase comprising, a plurality of radiated-signal translators physically spaced in two dimensions by predetermined wave length values at the nominal frequency of said range, a wave-signal translating circuit, means coupling said translators to said circuit and providing between any adjacent pair of translators spaced in one of the two dimensions an electrical spacing having a wave length value at said nominal frequency of a higher order of magnitude than said predetermined value of physical spacing of said pair of translators, whereby said system has a sharply directive characteristic having a maximum value in a direction which varies with the frequency of a wave signal translated by said radiated-signal translators, and translating means interposed between said translators which are spaced in the other dimension and said wave-signal translating circuit for effectively varying the relative phases of the wave signals translated between said translators spaced in said other dimension and said circuit, whereby the directive characteristic of said system has a maximum value in a direction additionally varying with the relative phases of said last-mentioned translated wave signals.

7. An antenna system having a sharply-directive characteristic variable in one direction with frequency over a predetermined operating frequency range and variable in another direction with phase comprising, a plurality of antenna elements physically spaced in two dimensions by predetermined wave length values at the nominal frequency of said range, a wave-signal translating circuit, means coupling said elements to said circuit and providing between any adjacent pair of elements in one of the two dimensions an electrical spacing having a wave length value at said nominal frequency of a higher order of magnitude than said predetermined value of physical spacing of said pair of elements, whereby said system has a sharply-directive characteristic having a maximum value in a direction which varies with the frequency of a wave signal translated by said antenna elements, and translating means interposed between said antenna elements which are spaced in the other dimension and said wave-signal translating circuit for effectively varying the relative phases of the wave signals translated between said antenna elements spaced in said other dimension and said circuit, whereby the directive characteristic of said system has a maximum value in a direction additionally varying with the relative phases of said last-mentioned translated wave signals.

8. A radiated-signal translating system having a sharply-directive characteristic variable in direction with frequency over a predetermined operating frequency range comprising, a plurality of radiated-signal translators physically spaced in one dimension by predetermined wave length values at the nominal frequency of said range, a wave-signal translating circuit, and wave-signal delay means coupling said translators to said circuit and providing between any adjacent pair of translators an electrical spacing having a wave length value at said nominal frequency of a higher order of magnitude than said predetermined value of physical spacing of said pair of translators, whereby said system has a sharply-directive characteristic having a maximum value in a direction which varies with the frequency of a wave signal translated by said radiated-signal translators.

9. A radiated-signal translating system having a sharply-directive characteristic variable in direction with frequency over a predetermined operating frequency range comprising, a plurality of radiated-signal translators physically spaced in one dimension by predetermined wave length values at the nominal frequency of said range, a wave-signal translating circuit, and a plurality of electrical delay networks individually interposed between said translators for coupling said translators to said circuit and for providing between any adjacent pair of translators an electrical spacing having a wave length value at said nominal frequency of a higher order of magnitude than said predetermined value of physical spacing of said pair of translators, whereby said system has a sharply-directive characteristic having a maximum value in a direction which varies with the frequency of a wave signal translated by said radiated-signal translators.

10. An antenna system having a sharply-directive characteristic variable in direction with frequency over a predetermined operating frequency range comprising, a plurality of antenna elements physically spaced in one dimension by predetermined wave length values at the nominal frequency of said range, a wave-signal translating circuit, and wave-signal delay means coupling said antenna elements to said circuit and providing between any adjacent pair of elements an electrical spacing having a wave length value at said nominal frequency of a higher order of magnitude than said predetermined value of physical spacing of said pair of elements, whereby said system has a sharply-directive characteristic having a maximum value in a direction which varies with the frequency of a wave signal translated by said antenna elements.

ARTHUR V. LOUGHREN.